United States Patent [19]

Gale

[11] 4,366,787

[45] Jan. 4, 1983

[54] INLET PORTS IN I.C. ENGINES

[75] Inventor: Nigel F. C. Gale, Upper Beeding, England

[73] Assignee: Ricardo Consulting Engineers Limited, West Sussex, England

[21] Appl. No.: 43,894

[22] Filed: May 30, 1979

[30] Foreign Application Priority Data

May 31, 1978 [GB] United Kingdom ............... 25113/78

[51] Int. Cl.[3] .............................................. F01L 3/00
[52] U.S. Cl. ............................... 123/188 M; 123/306
[58] Field of Search ............... 123/188 M, 193 H, 306

[56] References Cited

U.S. PATENT DOCUMENTS

| 3,145,696 | 8/1964 | Baster | 123/188 M |
| 3,802,404 | 4/1974 | Grosseau | 123/193 H |
| 3,903,849 | 9/1975 | List et al. | 123/188 M |
| 4,078,530 | 3/1978 | Okabe et al. | 123/188 M |
| 4,137,886 | 2/1979 | Hiramatsu | 123/188 M |
| 4,207,854 | 6/1980 | Alford et al. | 123/188 M |

FOREIGN PATENT DOCUMENTS

| 464617 | 5/1924 | Fed. Rep. of Germany ... | 123/188 M |
| 1272627 | 7/1968 | Fed. Rep. of Germany. | |
| 1951253 | 4/1971 | Fed. Rep. of Germany. | |
| 2164001 | 7/1972 | Fed. Rep. of Germany. | |
| 2385903 | 10/1978 | France. | |
| 603054 | 6/1948 | United Kingdom. | |
| 881089 | 11/1961 | United Kingdom. | |
| 1049234 | 11/1966 | United Kingdom. | |
| 1282175 | 7/1972 | United Kingdom. | |
| 1305884 | 2/1973 | United Kingdom. | |

Primary Examiner—Craig R. Feinberg
Assistant Examiner—W. R. Wolfe
Attorney, Agent, or Firm—Price, Heneveld, Huizenga & Cooper

[57] ABSTRACT

A cast cylinder head for a reciprocating-piston i.c. engine is formed with helical inlet ports at least 50% of the internal surface area of each of which is afforded by a machined surface or surfaces. Each such port may be formed in two machining operations, in one of which the inlet duct is machined and in the other of which the bowl is formed with a cylindrical lower portion and a hemispherical upper portion. A recess may be machined in a third operation in one side of the bowl. The inlet duct may be lined by a liner sleeve at least over its inner end portion, the inner end of the sleeve protruding into the bowl as a swirl barrier. Alternatively the port may be formed asymmetrically by numerically-controlled machining, a barrier lip being formed as a part of the machining operation.

16 Claims, 12 Drawing Figures

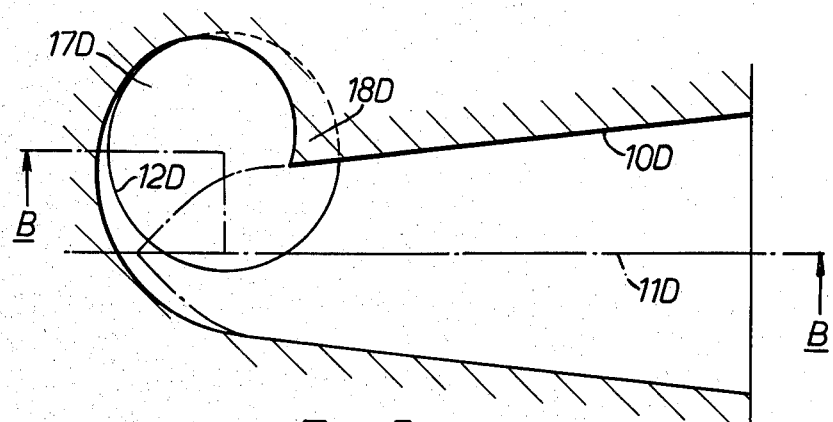
FIG. 5A.
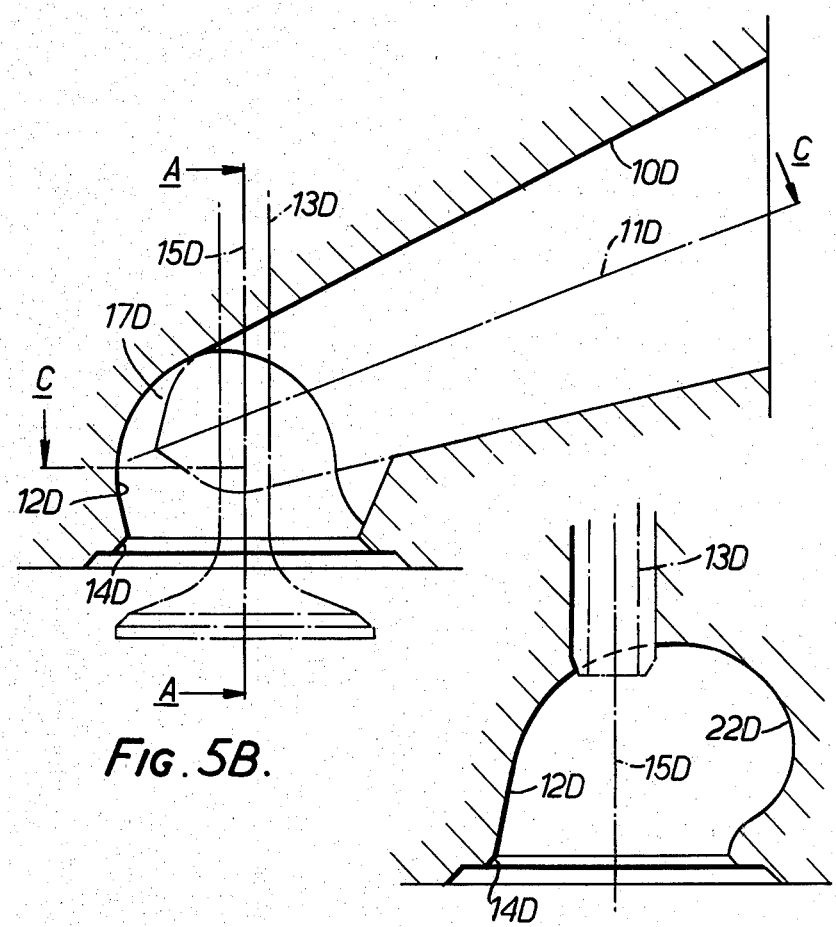
FIG. 5B.
FIG. 5C.

INLET PORTS IN I.C. ENGINES

BACKGROUND OF THE INVENTION

This invention relates to internal combustion engines of the reciprocating piston type, and concerns the formation of the inlet ports in the cylinder heads of such engines. The invention is particularly although not exclusively applicable to the inlet ports of both compression-ignition and spark-ignition engines of the liquid-fuel-injection type.

An object of the invention is to provide a method of producing inlet ports shaped to induce a high degree of swirl in the inlet gases entering the combustion chamber of the engine, to an acceptable degree of consistency. Engines which use swirl to assist combustion normally require a precise speed of swirl to achieve efficient combustion. If the degree of swirl in each cylinder of a multi-cylinder engine varies, then combustion in some of the cylinders will not be optimum. This is why consistency of swirl generation by inlet ports is important to achieve good fuel consumption and, in some cases, low exhaust emissions.

Two kinds of inlet ports which generate swirl are known, the first being the so-called helical inlet port, defined as being an inlet port in which the inlet gases are led through an inlet duct to enter a substantially annular portion of the port (referred to as the bowl) above the valve seat and around the valve stem, the inlet duct intersecting the bowl asymmetrically (with respect to the axis of the inlet valve and the valve seat) so that the outer side of the inlet duct merges smoothly with the internal surface of the wall of the bowl. Thus the inlet gases are introduced in a generally circumferential direction into the bowl from the inlet duct whose longitudinal axis is radially-offset from the "vertical" axis of the valve stem and valve seat, so that the gases will travel along a helical path around the valve stem in the bowl of the port and thereby acquire angular momentum before passing over the valve seat into the combustion chamber. A frequent though not indispensable feature of the helical inlet port design is the provision of a barrier or fin which protrudes into the bowl near the inner side of the inlet duct and deflects gas passing round the bowl, so avoiding interference with gas leaving the end of the duct and entering the bowl.

The arrangement of a helical inlet port is thus contrasted with that of a so-called "directed" inlet port in which the axis of the straight, downwardly inclined inlet duct intersects, or almost intersects, the axis of the valve stem in an arrangement which is symmetrical in plan, so that the inlet gases are biassed to enter the combustion space in one direction, or in other words the inlet gases have a linear momentum which is converted to the necessary angular momentum within the combustion chamber.

It has been the practice to form a helical inlet port by casting, on account of its complex shape, as a part of the operation of casting the cylinder head, leaving the surfaces of the port as cast, but it has been found that the degree of swirl which such cast ports produce is very sensitive to minor inaccuracies in their shape, such as can occur during a production run through slight displacement of the casting core. Moreover even the roughness of the cast surface can affect the degree of swirl produced.

BRIEF SUMMARY OF THE INVENTION

According to one aspect of the invention, a cylinder head of an i.c. engine has a helical inlet port, as defined above, at least a part of whose internal surface is a machined surface.

Thus in one form of the invention, the whole or at least part of the bowl of the port, and preferably also the downstream end portion of its inlet duct, is a machined surface.

According to another aspect of the present invention, a method of forming a helical inlet port, as defined above, in the cylinder head casting of an i.c. engine of the reciprocating piston type, includes the step of machining the head to form at least a part, and preferably at least 50% of the whole internal surface of the port as a machined surface or surfaces. For example, substantially the whole of the internal surface of the port may be machined.

Preferably the method comprises providing a cylinder head casting formed with a cast internal recess generally corresponding to but slightly smaller than the required final shape of the helical port, and machining the cast surface of the recess to provide the said machined surface or surfaces and finish the port to its required dimensions.

In one form of the invention the method comprises machining the head to provide a straight passage constituting the inlet duct at least the inner end portion of which is machined to a circular or any other machinable cross-section, the outer side of the inlet duct merging at its inner end into the surface of the bowl of the port, at least part of the internal surface of the bowl being also a machined surface.

The port may be formed in at least two machining operations, one machining operation forming the surface of at least the inner end portion of the inlet duct, and the other machining operation forming at least the major part of the internal surface of the bowl to circular or part-circular section above the valve seat.

A third machining operation may be performed on an enlargement of the bowl at the region of the intersection of the outer side of the duct with the surface of the bowl.

The third machining operation enables the shape of the rounded transitional portion of the outer wall of the duct to be improved at this intersection region. In this way serious discontinuities in the surface of the port at this intersection region can be avoided, even with a large degree of radial offset of the longitudinal axis of the duct from the centre of the bowl.

The cross-section of the inlet duct may be circular, or it may be of any other shape which can conveniently be machined, and the duct may be of uniform cross-section or tapering along its length. The bowl may be hemispherical, or cylindrical, or a combination of a cylindrical lower portion having the valve seat at its lower end and a hemi-spherical upper portion merging into the upper end of the cylindrical portion, or any other convenient axi-symmetrical shape. Herein the terms "upper" and "lower" are used in the context of a valve port having a vertical-axis inlet valve with the valve seat at the bottom of the port and a downwardly-inclined inlet duct leading into the bowl of the port.

Since an integral barrier projecting into the annular portion of the port would be difficult to form by a machining operation, an equivalent barrier member may be provided by an inwardly-projecting end portion of a liner sleeve fitted into the inner end of the duct to extend through the intersection of the duct with the bowl.

The invention comprises not only the new method referred to of forming a helical inlet port by machining, but also an engine cylinder head having at least one such machined helical inlet port formed therein.

BRIEF DESCRIPTION OF THE DRAWINGS

The invention may be carried into practice in various ways, but two specific embodiments will now be described by way of example only and with reference to the accompanying drawings, in which:

FIGS. 5A, 5B and 5C are views similar to FIGS. 4A, 4B and 4C of a modified shape of helical inlet port finished by numerical machining.

FIGS. 1A and 1B show a so-called "directed" inlet port comprising a straight cylindrical inlet duct 10 whose axis 11 is downwardly-inclined and leads into a bowl portion 12 having a hemi-spherical upper end through which the stem 13 of the inlet valve projects. The valve seat 14 is formed at the open lower end of the bowl 12. The axis 11 of the inlet duct intersects the vertical axis 15 of the bowl 12 which is coincident with the axis of the valve stem. Although most "directed" inlet ports are formed by casting, the simple and symmetrical shape of the directed port would enable it to be readily formed by machining. The cylinder wall of the engine is shown at 16.

FIGS. 2A and 2B show a known form of so-called "helical" inlet port formed by casting and designed to produce a high degree of swirl in the inlet gases on entering the combustion chamber. In certain situations helical ports are more suitable than "directed" inlet ports. In FIGS. 2A and 2B the downwardly-inclined inlet duct 10A is tapering and enters the bowl 12A obliquely, the projected axis of the duct being offset radially from the axis 15A of the bowl, so that the gases enter the bowl in a generally circumferential direction and travel in a helical path around the annular portion 17A of the bowl interior which surrounds the valve stem 13A, before passing over the valve seat 14A into the combustion chamber. The arrows A show the flow paths of the inlet gases. An integral fin 18A is provided at the radially-inner part of the junction between the inlet duct 10A and the bowl 12A, the fin 18A projecting downwardly from the upper part of the duct so as to prevent the gas flow which circulates around the valve stem 13A from crossing the downstream end of the inlet duct and interfering with the flow of fresh gases entering the bowl 12A from the duct 10A.

Figure 1A:
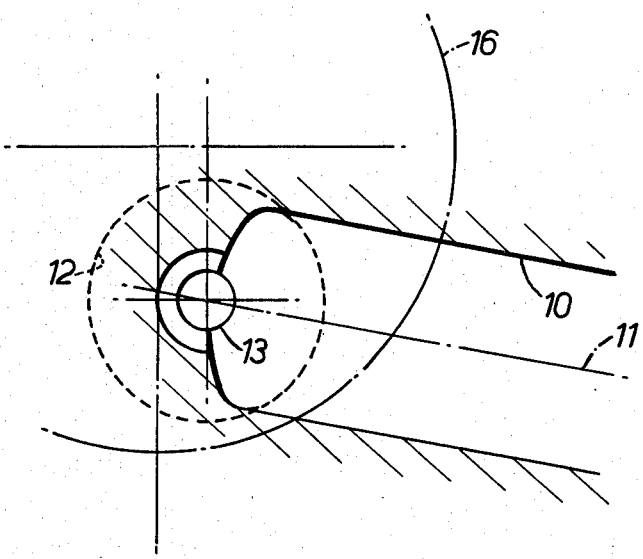
FIGS. 1A and 1B show in plan and sectional elevation an inlet port of the so-called "directed" type, not embodying the invention.
Figure 1B:
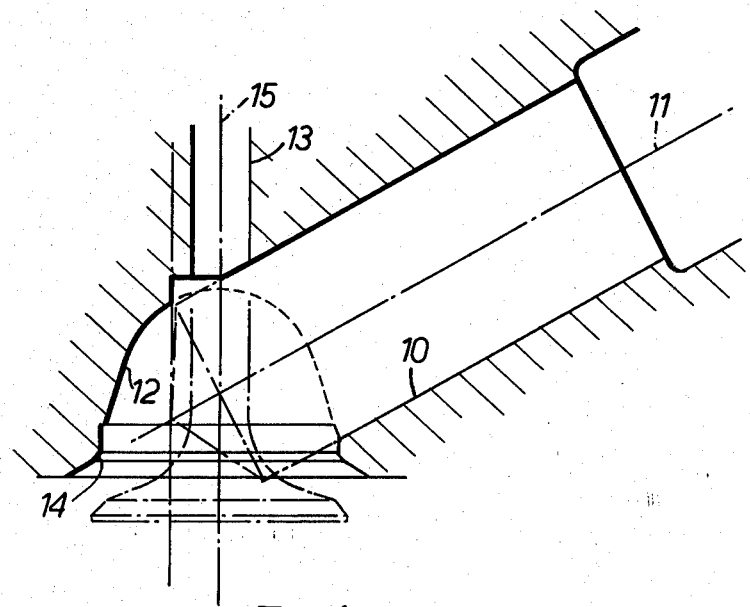
Figure 2A:
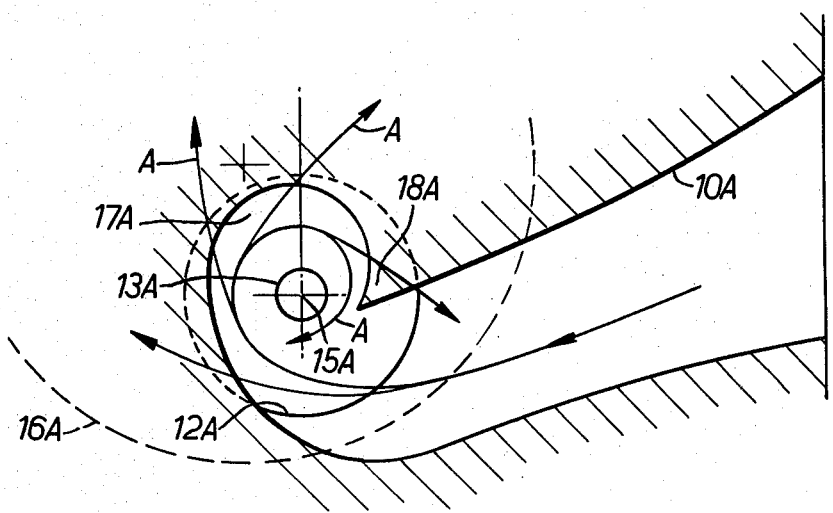
FIGS. 2A and 2B show, in plan and sectional elevation, a cast inlet port of the so-called helical type, not embodying the invention.
Figure 2B:
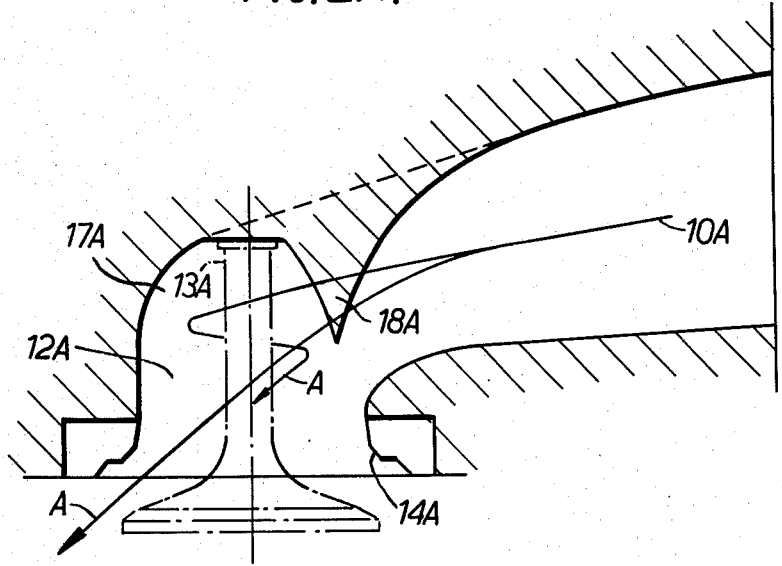

It will be seen that the helical port of FIGS. 2A and 2B has a complex asymmetrical shape designed to transform the linear momentum of the gas flow in the duct 10A into angular momentum in the annular portion 17A of the bowl 12A before the gases enter the combustion chamber. This port is formed wholly by casting, and it will be appreciated that any slight inaccuracy in the positioning of the casting core in the mold will significantly affect the accuracy of the cast port shape and, as mentioned above, affect the degree of swirl produced in the gases, as may the roughness of the cast surfaces of the port.

DESCRIPTION OF THE EXAMPLES

Figure 3B:
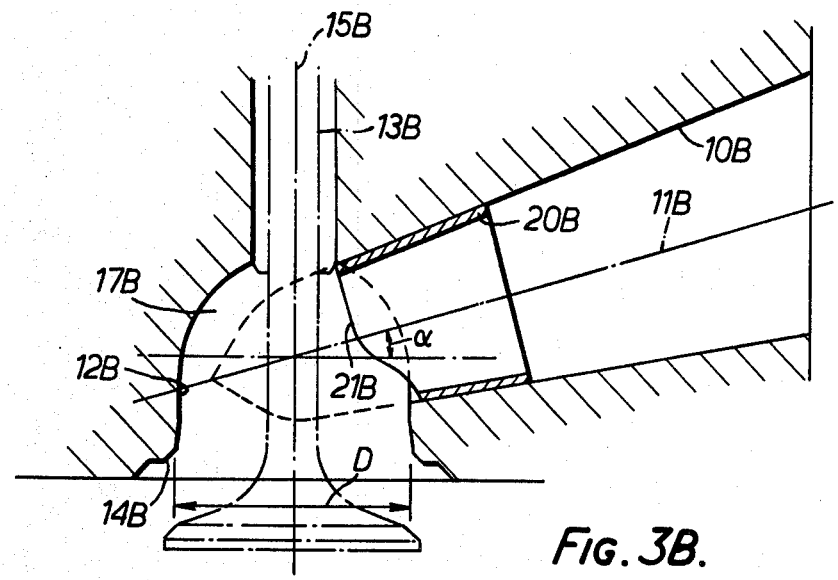
FIGS. 3A and 3B show, in plan and sectional elevation, a first embodiment of the invention comprising a helical inlet port whose surface is fully machined in two machining operations.
Figure 3A:
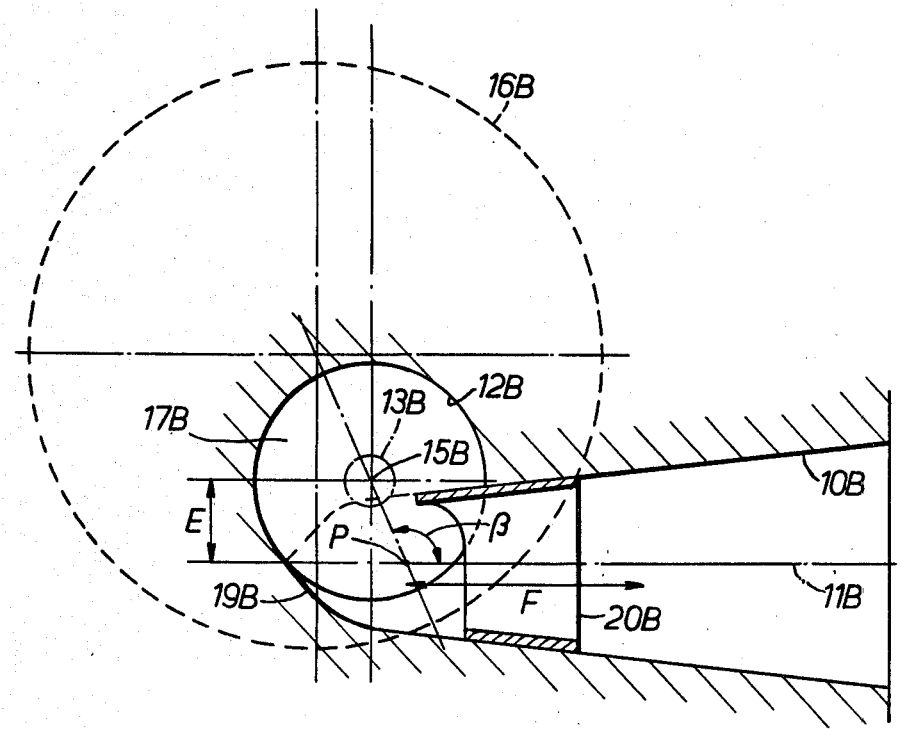

FIGS. 3A and 3B show one embodiment of the invention in which the surfaces of a helical inlet port are machined, whereby such inaccuracies and roughness can be avoided even in a long production run.

In FIGS. 3A and 3B, the cylinder head is cast with an internal recess formed by a pattern or core, the recess being of the general shape of the required helical port but a little under-size. The cast head is then subjected to machining operations, in which the inlet duct 10B is machined as a tapering duct of circular cross-section in one machining stage, and the bowl 12B leading to the valve seat 14B is machined as a cylindrical recess with a hemi-spherical upper part through which the valve stem 13B projects coaxially. Both these machining operations are straightforward and they can be performed in either sequence. The entire internal surfaces of both bowl and duct are thus finished by machining to the accurate final dimensions required.

It will be seen that the axis 11B of the duct 10B is offset from the axis 15B of the bowl 12B by a distance E, and the inner end of the duct as machined tapers more abruptly than the majority of its length to form a rounded transitional portion 19B which blends smoothly into the side wall of the bowl 12B, thereby leading the gas flow from the duct smoothly into the annular portion 17B. In the construction of FIGS. 3A and 3B an integral fin such as the fin 18A of FIGS. 2A and 2B cannot easily be provided by simple machining, and accordingly a pressed steel liner sleeve 20B is fitted in the inner end of the duct 10B as a close fit against its machined wall surface, the liner 20B projecting in part through the junction between the duct 10B and the bowl 12B to form a barrier portion 21B which extends across the annular portion 17B towards the valve stem to perform a function similar to that of the fin 18A, that is, to prevent the gas flow in the annular portion 17B from crossing the mouth of the duct 10B and interfering with the entry of fresh gas into the bowl 12B. If desired the duct 10B may be machined with a stepped larger-diameter inner end portion to receive the sleeve 20B with a flush fit.

For helical ports, the offset distance E of the duct axis will usually be between 0.125 D and 0.5 D, where D is the inner seat diameter of the port. The distance E thus represents the arm of momentum of the gas flow about the bowl axis 15B, so an increase in the value of the ratio E:D will in many cases produce an increase in the swirl. However large values of the ratio E:D could cause serious discontinuities between the machined surfaces of the duct and bowl produced by the two machining operations.

The inlet duct 10B could be of constant cross-section along its whole length, or partly-tapered and partly of constant cross-section. It need not be of circular section, but could be of some other machinable section.

The axis 11B of the duct 10B may be angularly orientated about the vertical valve axis 15B at any convenient angle to suit the bolting arrangements of particular head designs.

In addition to the predominant helical mode of swirl generated by this type of port there is an additional directed mode of swirl, and in order to utilise this to the maximum it is necessary that the duct 10B be correctly orientated with respect to the cylinder. To achieve this the angle $\beta$ in FIG. 3A should be greater than 45° and less than 135°. $\beta$ is the angle included between the projected line joining the centres of the cylinder 16B and of the valve seating 12B, and the duct axis 11B which that line intersects at point P. The angle $\alpha$ in FIG. 3B, which defines the angle of the duct axis 11B to "horizontal" planes parallel to the valve seating, should be between zero and 70°.

The insert sleeve 20B need not be of circular section, and its ends could be shaped to almost any form; the amount it protrudes into the annular portion of the valve port bowl is determined by the swirl demanded of the port. In a multi-cylinder engine, the shape and position, e.g. the degree of protrusion, of the sleeve may be different for each port in the engine. The variation in the sleeve shape and/or position may be arranged to counter the different effects of the induction manifold on the swirl in the various cylinders so that the same amount of swirl is generated in each cylinder.

The upper portion of the bowl of the port need not necessarily be hemispherical, as shown in FIG. 3B, but it could have for example a cylindrical or a conical shape, axi-symmetric about the valve guide axis 15B.

Figure 4B:
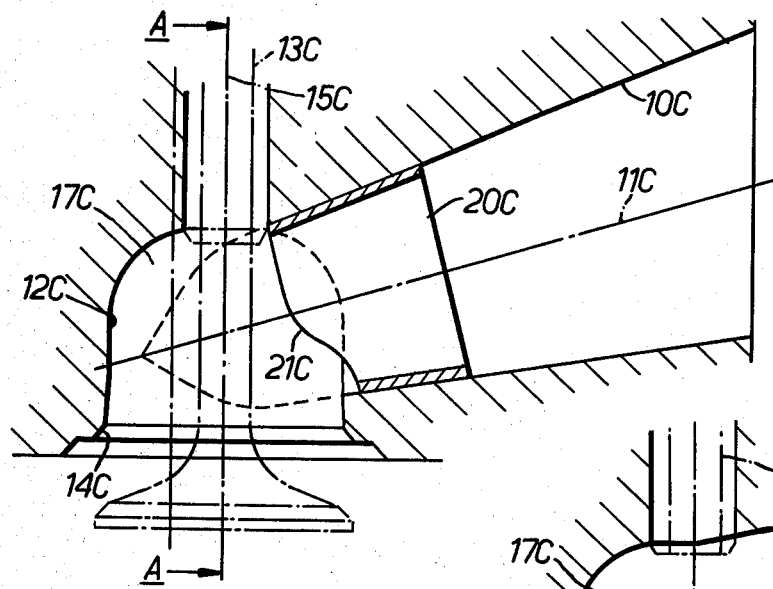
FIGS. 4A, 4B and 4C show a second embodiment of the invention in which a fully-machined helical port has been subjected to a third machining operation, FIG. 4B being in section on the line B—B in FIG. 4A, and FIG. 4C being in section on the line A—A in FIG. 4B.
Figure 4C:
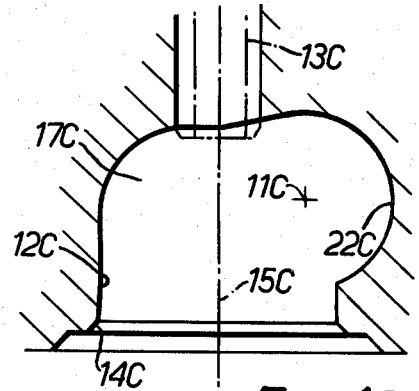
Figure 4A:
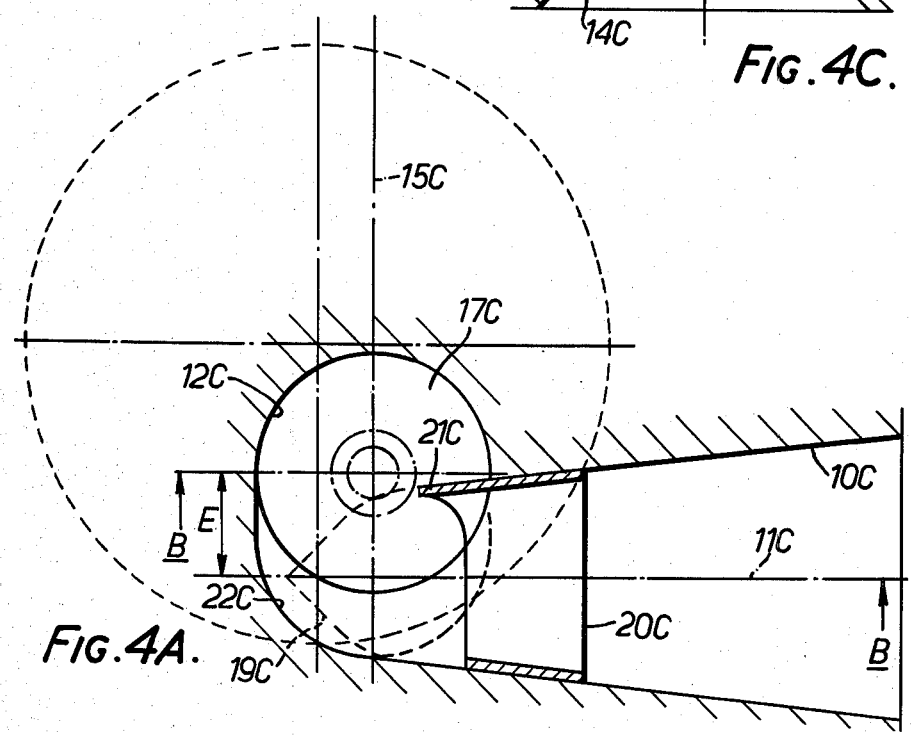

FIGS. 4A to 4C show a modified embodiment of the invention in which the ratio E:D is greater than it is in FIG. 3, but in which discontinuities have been avoided by means of a third machining stage in which the bowl has been enlarged locally in its side wall at 22C beyond the limit 19C of the machining of the duct 10C in the first machining stage. In this way there is produced a part-spherical transitional surface 22C by which the side wall of the duct is merged smoothly into the side wall of the bowl 12C. A pressed steel liner sleeve 20C with a projecting barrier portion 21C is provided as in FIGS. 3A and 3B. The various items of the construction of FIGS. 4A to 4C are identified by the same reference numerals as the equivalent items in FIGS. 3A and 3B, but with the suffix C instead of the suffix B.

This third machining stage need not necessarily form a part-spherical shape as shown at 22C, but any re-entrant shape above the valve seat deemed appropriate to generate swirl efficiently could be adopted. The re-entrant shape, spherical or otherwise, may also extend upwardly above the "roof" of the previously-machined annular portion 17C.

The third machining stage enables the dimension E to be increased to 0.75D, and it also permits the diameter of the duct 10C to be increased whilst still retaining a blended interface with the annular portion.

The functional part of the liner sleeve 20B or 20C is that portion 21B and 21C which extends into the annular portion 17B or 17C of the port to form the barrier for the circulating gas flow, and this projecting portion can be given various shapes. As it carries no load the sleeve 20B or 20C can be less robust than is indicated diagrammatically in the drawings, and it need not extend around the whole circumference of the duct. In certain cases the sleeve 20B or 20C could be omitted altogether.

The embodiment shown in FIGS. 5A to 5C is similar to those of FIGS. 3A, 3B and 4A to 4C except that it involves the use of a numerically-controlled machine tool to form the annular portion 17D. This enables the bowl portion 12D to be non-axisymmetric about the supposed machining axes, and enables re-entrant shapes such as shown at 22D in FIG. 5C to be readily formed.

Recourse to a numerically-controlled machine tool will aid the suppression of discontinuities in the port shape between the duct and the annular portion of the bowl, and allow the annular portion to have a shape which is most beneficial for efficient flow through the port, while permitting the function of the sleeve to be provided for by the machining of a lip 18D. Otherwise the characteristics and limits of this embodiment are similar to those already set out in relation to FIGS. 3A, 3B and 4A to 4C.

In all the embodiments shown in FIGS. 3A to 5C, the whole or substantially the whole of the internal surface of each port is described as being machined, including the area covered by the liner sleeve if any in the duct. Whilst it is necessary or at least desirable for the inner end portion of the inlet duct beneath the liner sleeve to be machined so as to ensure that the liner sleeve is accurately positioned, it is not essential that the entire remaining internal surface of the port should be finished by machining. In general, at least 50% of the total internal surface of the port, including that covered by the sleeve, should be a machined surface, but other parts can remain unmachined, i.e. as cast.

For example, whilst the inner end portion of the inlet duct should be machined or lined by the smooth sleeve, the upstream end portion of the inlet duct may be left as cast. The axial length of the inner end portion of the inlet duct which must be either a machined surface or be covered by the sleeve should be a distance F equal to at least the inner diameter D of the inlet valve seat, F being measured in the upstream direction from the point P shown in FIG. 3A along the axis of the duct. Upstream of the outer limit of F, the duct surface could be left as cast.

Moreover, whilst the greater part of the internal surface of the bowl of the port should be machined, it is possible that a minor portion of its surface might be left unmachined, i.e. as cast, without excessive loss of consistency in swirl generation. For example, in the arrangement of FIGS. 4A, 4B and 4C it is possible for the local enlargement in the side wall of the bowl at 22C to have been formed in the initial casting operation and to be left unmachined and as cast, the remainder of the internal surface of the bowl being finished by machining in the second machining stage.

It will also be appreciated that whilst in each of the embodiments of FIGS. 3A, 3B, 4A, 4B, 4C and 5A, 5B, 5C as described above the cylinder head was initially cast with an internal under-size recess corresponding to the helical port shape, which recess was then finished by machining, it would be perfectly possible to provide a solid head casting and to machine out the entire helical port, both duct and bowl, from the solid metal.

What we claim as our invention and desires to secure by Letters Patent is:

1. A cylinder head for a reciprocating-piston internal combustion engine, of the type formed with a helical-swirl-inducing inlet port which comprises an inverted bowl whose upper side is closed by a roof and whose lower side is open and is defined by a circumferential rim, an annular valve seat extending around said rim and a valve guide for the stem of an associated poppet valve opening through said roof, said valve guide having a longitudinal axis, said cylinder head comprising:

an open-ended inlet duct extending inwardly from the exterior of the cylinder head and having a means for inducing gas entering said bowl of said port to swirl circumferentially within said bowl and around said valve guide axis before passing out of said bowl across said annular valve seat into an associated engine cylinder comprising a straight downstream end portion of said inlet duct which intersects said bowl asymmetrically with respect to the longitudinal projection of said valve guide axis, substantially the whole of the longitudinal projection of the straight downstream end portion of said inlet duct passing to one side of the projected valve guide axis; and a generally tubular open-ended insert sleeve fitted into said straight downstream end portion of said inlet duct against the internal wall thereof, said sleeve having a longitudinal axis substantially coincident with the central axis of said end portion of said inlet duct and passing to one side of the projected valve guide axis, said sleeve being provided with a wall having an end portion lying near the longitudinal projection of said valve guide axis, said end portion projecting beyond the internal circumferential surface of the bowl and into the interior of said bowl to provide a swirl control vane located immediately adjacent to the open inner end of said inlet duct, said swirl control vane extending into said bowl from a level adjacent the roof thereof to a level further from said roof and nearer to said valve seat whereby said swirl control vane deflects circumferential gas flow around said valve guide axis in the upper part of said bowl from along the lateral bowl surface and in a generally radially inward direction toward said valve guide axis, to thereby enhance the entry of gas from the duct into the bowl by reducing interference between the entering gas and the swirling circumferentially-flowing gas already within said bowl.

2. A cylinder head as in claim 1, in which said bowl has an internal surface which is of circular cross-section in planes perpendicular to said valve guide axis, said surface being co-axial with said valve guide axis, and in which said sleeve is terminated at its open inner end by a profiled circumferential edge whereof a portion lying nearest to the longitudinal projection of said valve guide axis constitutes said swirl control vane and a portion on the side of said sleeve remote from said projected valve guide axis lies outside the bowl, and in which the internal surface of the straight downstream end portion of said inlet duct on the side thereof remote from said projected valve guide axis is joined smoothly to said internal surface of the bowl by a concave transitional surface.

3. A cylinder head as in claim 2 having a concave recess formed as an enlargement of said circular-section internal surface of the bowl and comprising the majority of said transitional surface.

4. A cylinder head as in claim 3 which is a casting, and which the surface of the enlargement recess is as cast.

5. A cylinder head as in claim 3, in which the projected longitudinal axis of said straight downstream end portion of the inlet duct is offset from the axis of the valve guide by a distance corresponding to between one half and three quarters of the inner diameter of the valve seat.

6. A cylinder head as in claim 3 or claim 5, in which the surface of the said recess is a part-toroidal machined surface which is eccentric with respect to the axis of the valve seating.

7. A cylinder head as in any one of claims 1, 2 or 3 in which substantially the whole of the internal surface of the inlet port is machined.

8. A cylinder head as in any one of claims 1, 2 or 3 in which the longitudinal axis of the inlet duct is inclined upwardly at an angle of not more than 70° to the general plane of the valve seat.

9. A cylinder head as in any one of claims 1, 2 or 3 in which the included angle between the projected longitudinal axis of the inlet duct and a line joining the centre of the valve seat and the axis of the cylinder is between 45° and 135°.

10. A cylinder head as in any one of claims 1, 2 or 3 in which a portion of the length of the inlet duct extending from its downstream end over a distance at least equal to the inner diameter of the inlet valve seat has its internal surface machined and lined by said insert sleeve.

11. A cylinder head as in any one of claims 1, 2 or 3, said cylinder head being adapted for mounting on a multi-cylinder i.c. engine of the reciprocating piston type having an inlet port and a swirl control vane associated with each cylinder, the swirl control vanes associated with different cylinders of the engine being respectively differently shaped.

12. A cylinder head as in any one of claims 1, 2 or 3 in which a portion of the length of the inlet duct extending from its downstream end over a distance at least equal to the inner diameter of the inlet valve seat has a machined internal surface which is partly exposed and partly lined by said insert sleeve.

13. A cylinder head as claimed in any one of claims 1, 2 or 3, said cylinder head being adapted for mounting on a multi-cylinder i.c. engine of the reciprocating piston type having an inlet port and a swirl control vane associated with each cylinder, the swirl control vanes associated with different cylinders of the engine being respectively differently positioned in their respective inlet ports.

14. A cylinder head as in any one of claims 1, 2 or 3 in which at least 50% of the total internal surface of the inlet port is machined.

15. A cylinder head as in claim 14 which is a casting and in which part of the internal surface of the inlet port is as cast and the remainder is machined.

16. A cylinder head as in claim 15 in which a portion of the internal surface of the inlet duct at its upstream end is as cast.

* * * * *